(12) United States Patent
Dawood et al.

(10) Patent No.: US 6,442,811 B1
(45) Date of Patent: Sep. 3, 2002

(54) BATTERY PLATE STACKER AND METHOD

(75) Inventors: Raad A. Dawood, Milwaukee; Donald C. Whittenburg, Nashotah; Raymond P. Rubocki, New Berlin, all of WI (US)

(73) Assignee: Johnson Controls Technology Company, Plymouth, MI (US)

( * ) Notice: Subject to any disclaimer, the term of this patent is extended or adjusted under 35 U.S.C. 154(b) by 84 days.

(21) Appl. No.: 09/607,387

(22) Filed: Jun. 30, 2000

Related U.S. Application Data

(62) Division of application No. 09/108,739, filed on Jul. 1, 1998, now Pat. No. 6,122,820.

(51) Int. Cl.$^7$ .............................................. H01M 10/14
(52) U.S. Cl. ........................ 29/2; 29/731; 29/623.1
(58) Field of Search ............................ 29/2, 731, 623.1

(56) References Cited

U.S. PATENT DOCUMENTS

| | | | |
|---|---|---|---|
| 2,148,371 A | | 2/1939 | Galloway ..................... 211/41 |
| 4,016,633 A | * | 4/1977 | Smith et al. ..................... 29/2 |
| 4,080,727 A | * | 3/1978 | Stolle et al. ............... 29/623.4 |
| 4,291,443 A | | 9/1981 | Laurie et al. ................. 29/6.1 |
| 4,315,356 A | | 2/1982 | Laurie et al. ................. 29/6.1 |
| 4,407,063 A | | 10/1983 | Johnson ..................... 29/623.2 |
| 4,462,745 A | | 7/1984 | Johnson et al. ............. 414/330 |
| 4,758,126 A | | 7/1988 | Johnson et al. ............. 414/330 |
| 4,822,234 A | | 4/1989 | Johnson et al. .......... 414/798.9 |
| 4,824,307 A | | 4/1989 | Johnson et al. ............. 44/798.2 |
| 4,882,234 A | | 11/1989 | Lai et al. ..................... 514/185 |
| 5,384,217 A | | 1/1995 | Binder et al. ............... 429/225 |
| 5,540,127 A | | 7/1996 | Binder et al. ................. 83/100 |
| 6,122,820 A | | 9/2000 | Dawood et al. |

FOREIGN PATENT DOCUMENTS

JP 56138871 10/1981

OTHER PUBLICATIONS

PCT Search Report dated Oct. 6, 1999 in PCT/US99/13291.

* cited by examiner

Primary Examiner—John S. Maples
(74) Attorney, Agent, or Firm—Foley & Lardner

(57) ABSTRACT

A battery plate stacker is delineated for enveloping expanded metal battery plates and stacking positive and negative plates in an alternating pattern, comprising, a battery plate feeder; a carrier coupled to the battery plate feeder; and a wire flattener module coupled to the carrier that conveys the expanded metal battery plates through the wire flattener module. The wire flattener module includes one or more pairs of rotatable members, each pair being aligned with a separate edge portion of an expanded metal battery plate while lying on the carrier. As the plate is conveyed through the pair(s) of members, they force any wires extending away from the surfaces of the plate back into positions flush with the plate surfaces, thereby avoiding puncturing of the separator material when it is crimped around the plate.

28 Claims, 2 Drawing Sheets

BATTERY PLATE STACKER AND METHOD

CROSS-REFERENCE TO RELATED APPLICATIONS

This patent application is a divisional patent application of U.S. patent application Ser. No. 09/108,739 titled "A Battery Plate Stacker Including A Wire Flattener Module And A Method Of Operation Therefor" filed Jul. 1, 1998 and issued Sep. 26, 2000 as U.S. Pat. No. 6,122,820.

BACKGROUND OF THE INVENTION

The present invention relates to a battery plate stacker, and more specifically relates to a battery plate stacker including a wire flattener module and a method of operation therefor.

The context for the present invention deals with battery plate stackers. However, prior to discussing the specific operation of a battery plate stacker, it is necessary to first understand the general steps involved in the production of batteries. In its simplest form, a battery comprises a plurality of positive and negative plates stacked in alternating fashion, and having a separator material interspersed between them. The battery plates are retained in a battery container, which also contains electrolytic fluid. The chemical interaction between the electrolytic fluid and the battery plates generates electrical current, which is drawn out through the battery terminals.

For example, U.S. Pat. No. 5,384,217 discloses one process for producing battery plates. This process for making such plates includes an initial step of melting hot lead in a furnace, followed by a step of feeding molten lead alloy to a strip caster. Trim from the caster is recycled to the furnace. The strip is coiled on a winder, and coils of lead alloy strip are stored for later use.

To form a battery grid, the coil is unwound and the free end is fed through an expander that cuts, slits, and stretches a strip of coil to form a mesh-like wire grid. U.S. Pat. Nos. 4,315,356 and 4,291,443 disclose expanders used in the production of wire grids for use in making negative expanded metal battery plates. The expanded strip or wire grid is then pasted by a conventional paster, and fed to a divider where the strip is cut. Plates cut from the strip are next flattened in order to smooth out any uneven regions of battery plate paste. From here, the plates pass on a conveyor through an oven for flash-drying, and are then stacked for later use. Flash-drying is performed using an open gas flame or an oven. After flash drying, the battery plates undergo a chemical treatment, well known to those skilled in the art.

Following chemical treatment of the battery plates, negative expanded metal plates are delivered to a stacker operator. Stacks of the negative expanded metal plates are then manually prepared by loosening the bonding, which results from the chemical set process, between adjacent plates. Next, the plates are inspected for visible damage prior to loading into the battery plate stacker.

Battery plates stackers, such as those manufactured by Tekmax of Oregon, are well known to those skilled in the battery arts. Such battery plate stackers generally include means for feeding the negative and the positive battery plates into the battery plate stacker, an enveloping module for wrapping negative expanded metal battery plates with a separator material, a conveyor for moving the negative and positive battery plates, and a module for stacking the negative and positive plates together.

In general, battery plate stackers are operated as follows. First, negative expanded metal battery plates are placed into the negative plate feeder, while positive battery plates are placed in a separate feeder. Individual negative expanded metal battery plates are separated from their stack and picked up by well known means, such as with a vacuum-type system, for moving the plates onto a carrier. Once on the plate stackers' carrier, the negative expanded metal battery plates are transferred through the plate stacker to the enveloping module. Here, the negative expanded metal battery plates are enveloped in a separator material. Additionally, a set of meshed wheels seal the separator material around the negative expanded metal battery plate, with the lug side of the plate open. The side of the negative expanded metal battery plate located opposite the lug side is flush against a crease in the separator material. At present, it is common during this crimping process that bent, exposed wires of the negative expanded metal battery plates' wire grid will pierce the separator material.

Next, separator-enveloped negative expanded metal battery plates exit the enveloping module and enter the stacking module. The stacker module will prepare a series of alternating negative and positive plates. Those skilled in the art understand that a single enveloped negative plate matched with a single positive plate is called a "chapter," while a plurality of stacked chapters is typically referred to as a "book."

The process of stacking the positive plates onto the negative plates is accomplished with a positive plate feeder that stacks a positive plate onto a separator-enveloped negative expanded metal battery plate as it is conveyed past the positive battery plate feeder. From this point, the book of battery plates are transferred into a cast-on strap machine. The cast-on strap machine will cast a strap to join all negative plate lugs, and a separate strap to join all positive plate lugs in the book. The battery plate book, now with straps connected, is placed into the battery case.

As the process for producing batteries is so lengthy and complex, and the present methodology for detecting electrical shorts occurs only after the battery has been substantially assembled, a need exists to eliminate the source of electrical shorts altogether. The present invention provides an improved battery plate stacker including a wire flattener module that substantially eliminates the occurrence of electrical shorts resulting from piercing the separator material with exposed wires from the expanded metal battery plate wire grid.

BRIEF SUMMARY OF THE INVENTION

One embodiment of the present invention includes a battery plate stacker for enveloping expanded metal plates and stacking positive and negative plates in an alternating pattern, comprising, a battery plate feeder, a carrier coupled to the battery plate feeder, and a wire flattener module coupled to the carrier conveying the expanded metal plates through the wire flattener module. The inclusion of the wire flattener module in the battery plate stacker presents a major advance over the art, since it reduces the incidence of separator damage from wires along the edge of the expanded metal plates that extend away from the plate's surface. By reducing the occurrences of separator damage from extended wires, the present invention reduces the average time required to produce a number of properly operating batteries, and increases the overall quality of the batteries.

The carrier comprises a pair of driven chains, wherein each chain has at least one dog aligned with a corresponding dog on the other chain for engagement with an edge of an expanded metal plate.

The wire flattener module comprises a pair of members having a gap in between, and a portion located near an edge of each expanded metal plate passes through the gap. Preferably, the gap is less than or equal to the minimum thickness of the portion located near the edge for each expanded metal plate. Setting the gap distance to the minimum plate width, or smaller, one ensures the ability to handle expanded metal plates of larger widths. For example, if a manufacturers' minimum expanded metal plate width was 0.040" then a gap width of 0.040" (or smaller) makes sense because it enables handling plates with larger widths, thereby creating system flexibility.

The pair of members preferably comprises a first disk and a second disk. Typically, the first and second disks are coplanar. Additionally, the first and second disks are rotatable about their respective axes, and one of the disks is spring-loaded toward the other disk. The first and second disks are located below and above, respectively, the expanded metal plate when it lies flat on the carrier. Moreover, a top surface of the first disk is located at a height substantially equal to the bottom surface of the expanded metal plate when it lies flat on the carrier.

Alternatively, one could define the pair of members of the wire flattener module in more general terms. For example, one member of the pair of members has a smooth, circumferential surface that is driven to make forcible, downward contact along an upper surface portion proximate the plates' edge when the expanded metal plate, while lying flat, is moved by the carrier through the gap. Similarly, the other member of the pair of members has a smooth, circumferential surface that makes forcible, upward contact along a lower surface portion proximate the plates' edge when the expanded metal plate, while lying flat, is moved by the carrier through the gap.

The wire flattener assembly further comprises a second pair of members having a second gap in between and through which another portion located near the opposite edge of each expanded metal plate passes. The second pair of members are substantially identical to those described above, so their details will not be repeated here. Nevertheless, note that addition of the second pair of members permits simultaneous wire flattening on opposing edges of each expanded metal plate. Without two pairs of such members, one envisions plates requiring wire flattening on only one edge, or if more than one edge needs wire flattening, then more than one pass through the single pair of members.

In another embodiment of the present invention, a method of processing expanded metal battery plates is disclosed comprising the steps of providing an expanded metal battery plate ready for envelopment in separator material, and having at least one edge with an exposed wire grid; applying force simultaneously on an upper and a lower surface in proximity to each edge with the exposed wire grid; and enveloping the expanded metal battery plate. The force is sufficient to move wires from the exposed wire grid that extend away from the upper and lower surfaces to positions substantially flush with the surfaces, without damaging the expanded metal battery plate. Sufficient force, as defined above, is established in large part by setting an appropriate gap (as mentioned with respect to the first embodiment disclosed above), and other design factors such as proper spring selection.

These and other objects, advantages, and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

Figure 1:
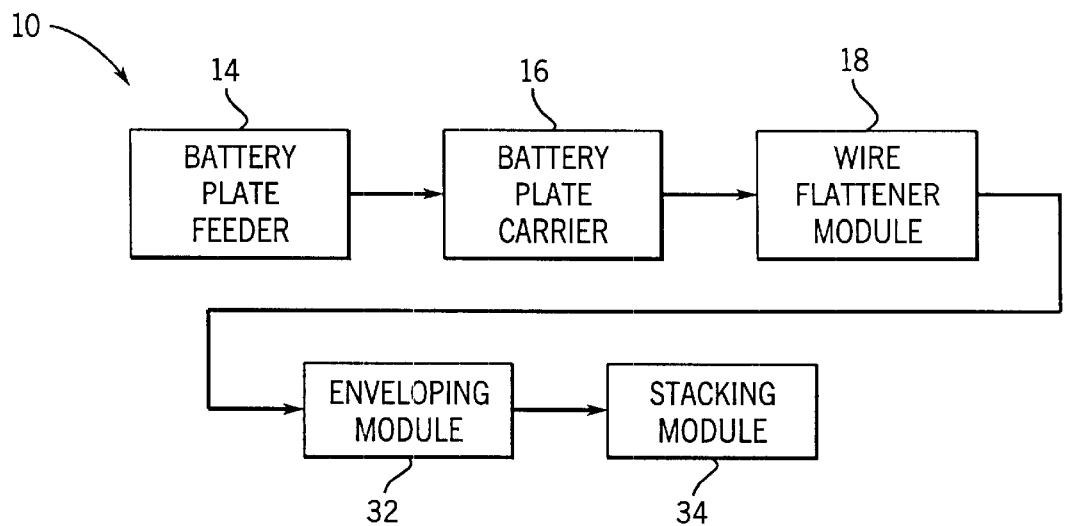
FIG. 1 is a simplified block diagram view of the battery plate stacker of the present invention.

Referring to FIG. 1, the battery plate stacker of the present invention is shown in simplified block diagram format, and is generally designated by reference number 10. The battery plate stacker 10 for enveloping negative expanded metal battery plates 12 (see FIG. 2) and stacking them in an alternating pattern with positive plates (not shown) comprises a battery plate feeder 14; a battery plate carrier 16 (hereafter "the carrier") coupled to the battery plate feeder 14; and a wire flattener module 18, coupled to the carrier 16 that conveys the negative expanded metal battery plates 12 through the wire flattener module 18. Also included in the battery plate stacker 10 are an enveloping module 32 and a stacking module 34. The present invention deals with a general-type battery plate stacker 10; however, in the preferred embodiment, the battery plate stacker 10 preferably comprises the TEKMAX Model Super 2000 JC battery plate stacker manufactured by TEKMAX Inc. of Tangent, Oreg. The TEKMAX Model Super 2000 JC battery plate stacker includes technology disclosed in the following U.S. Pat. Nos. incorporated herein by reference: 4,407,063; 4,462,745; 4,758,126; 4,822,234; and 4,824,307.

In general, the battery plate stacker 10 operates by placing a number of negative expanded metal battery plates 12 (hereafter referred to as "the plates" 12) into a negative plate feeder, and placing a number of positive plates into a positive plate feeder. Included in either battery plate feeder (although focus here is with respect to the negative battery plate feeder), is a loading system, such as a vacuum-type system which picks up one of the plates 12 and places them on a carrier 16. The carrier 16 conveys the plate 12 towards the wire flattener module 18. A standard TEKMAX Model Super 2000 JC battery plate stacker 10 does not include a wire flattener module 18. The present invention, however, modifies such a battery plate stacker 10 by including a wire flattener module 18. In the wire flattener module 18, any wires extending away from surface portions of the battery plate 12 are substantially forced to be flush with the battery plate surfaces, thereby preventing undesirable electrical shorts as discussed above.

From the wire flattener module 18, the battery plate 12 proceeds via the carrier 16 to the enveloping module 32. In the enveloping module 32, a piece of separator material is wrapped around a substantial portion of the battery plate 12. Also within the enveloping module 32, the separator material is crimped along the edges of the battery plate 12. At this point in prior approaches, piercing of the separator material typically occurred; however, due to the inclusion of the wire flattener module 18 in the improved battery plate stacker 10, piercing of the separator material is substantially avoided.

From the enveloping module 32, the battery plate 12 is moved by a carrier, like carrier 16, to the stacking module 34. Here, a positive plate (not shown) is placed on the conveyed negative expanded metal battery plate 12. The remainder of the battery production process is substantially the same as in the prior art; however, it cannot be overstated that the inclusion of the wire flattener module 18 into the battery plate stacker 10 substantially improves the efficiency of the operation of the battery plate stacker 10. In particular, undesirable electrical shorts resulting from piercing separator material with bent wires from the negative expanded metal battery plate wire grid is typically avoided.

Figure 3:
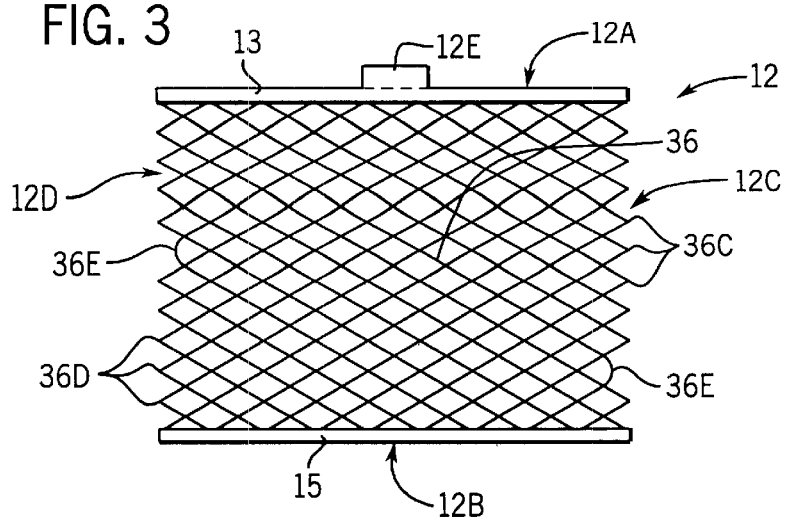
FIG. 3 is a planar view of a wire grid for an expanded metal battery plate.
Figure 4:
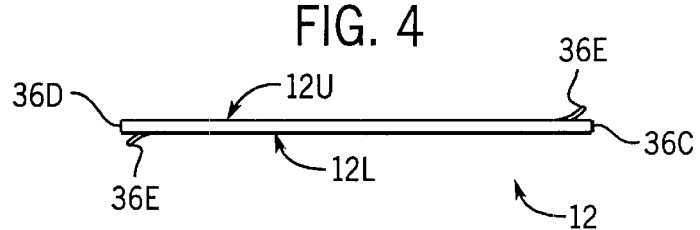
FIG. 4 is an end view (from the end 12b) of the wire grid from FIG. 3.

In an effort to facilitate a better understanding of the present invention, it is helpful to be able to visualize the source of the electrical shorts. In this regard and with reference to FIG. 3, a battery plate 12 is shown. The battery plate 12 has a top edge 12A, a bottom edge 12B, and side edges 12C and 12D. The battery plate 12 also includes a lug portion 12E along the top edge 12A. Note that along the top edge 12A, a member 13 is included, and along the bottom edge 12B, a member 15 is included. In between members 13 and 15 is a wire grid 36. Due to the inclusion of members 13 and 15, the top 12A and bottom 12B edges of the battery plate 12 (i.e., the corresponding edges of the wire grid 36) are not exposed. On the other hand, the side edges 36C and 36D of the wire grid 36 are exposed. In this context, "exposed" means that the ends 36C and 36D of the wire grid 36 are not bound by side members, such as members 13 and 15 along the top 12A and bottom 12B edges of battery plate 12. Because the side edges 36C and 36D of the wire grid 36 are not bound by any adjacent members, the wires extending from these edges are free to be moved. As was often the case prior to the inception of the present invention, wires along the side edges 36C and 36D of the wire grid 36 were bent away from the upper 12U and lower 12L surfaces (see FIG. 4) of the battery plate 12. For example, and with reference to FIG. 4, note that an exposed wire 36E along edge 36C extends away from the upper surface 12U of the battery plate 12. Similarly, along the edge 36D of the battery plate 12, wire 36E extends away from the lower surface 12L of the battery plate 12. Thus, extending wires like those shown by 36E pose the electrical short problem mentioned above. With the advent of the present invention, extending wires 36E pose no problem, as the wire flattener module 18 will cause extending wires 36E to be forced into positions flush against their respective upper 12U and lower 12L surfaces of the battery plate 12. Lastly, for the sake of clarity, it should be pointed out that the battery plate 12 and its associated wire grid 36 (as shown in FIG. 3) has been removed from a larger wire grid (not shown) in the battery production process. Additionally, note that the battery plate 12 shown in FIG. 3 is simply the wire grid 36, as no battery paste is shown.

Figure 2:
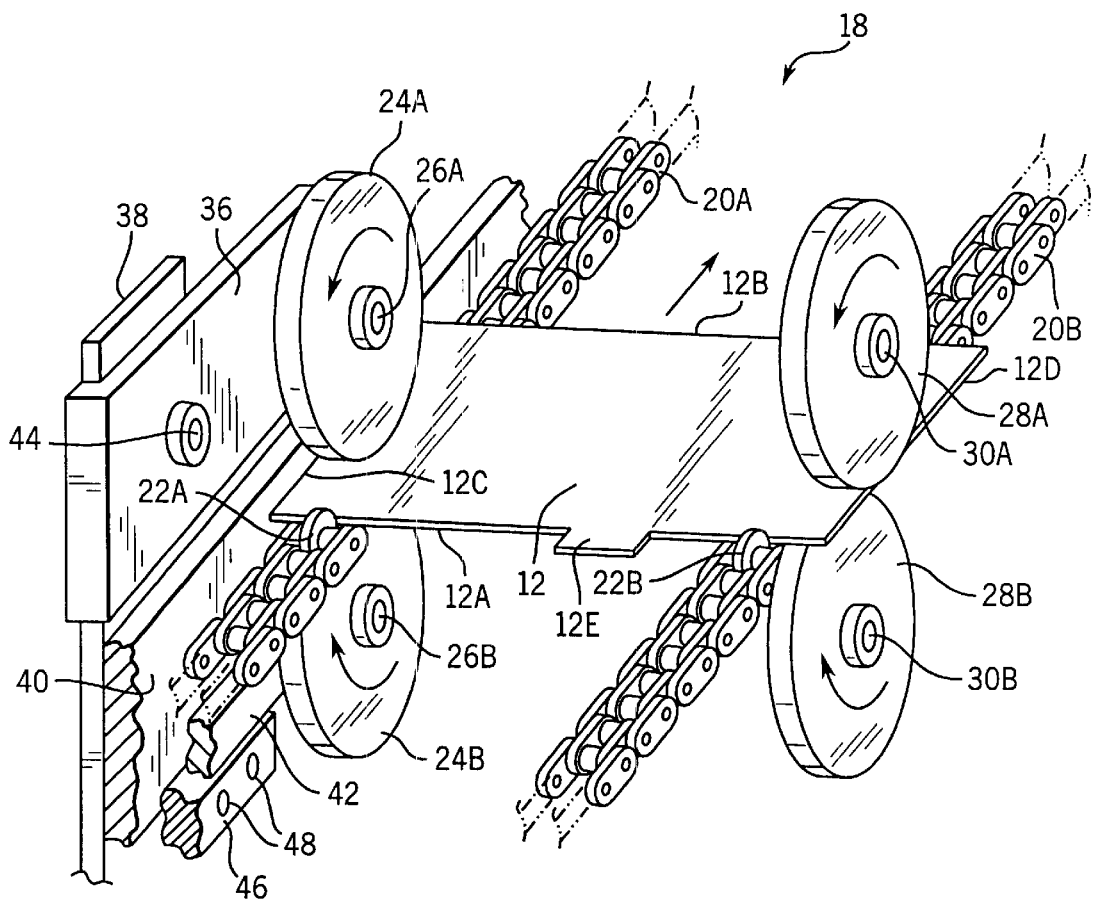
FIG. 2 is a simplified perspective view showing a portion of the wire flattener module of the present invention.
Figure 5:
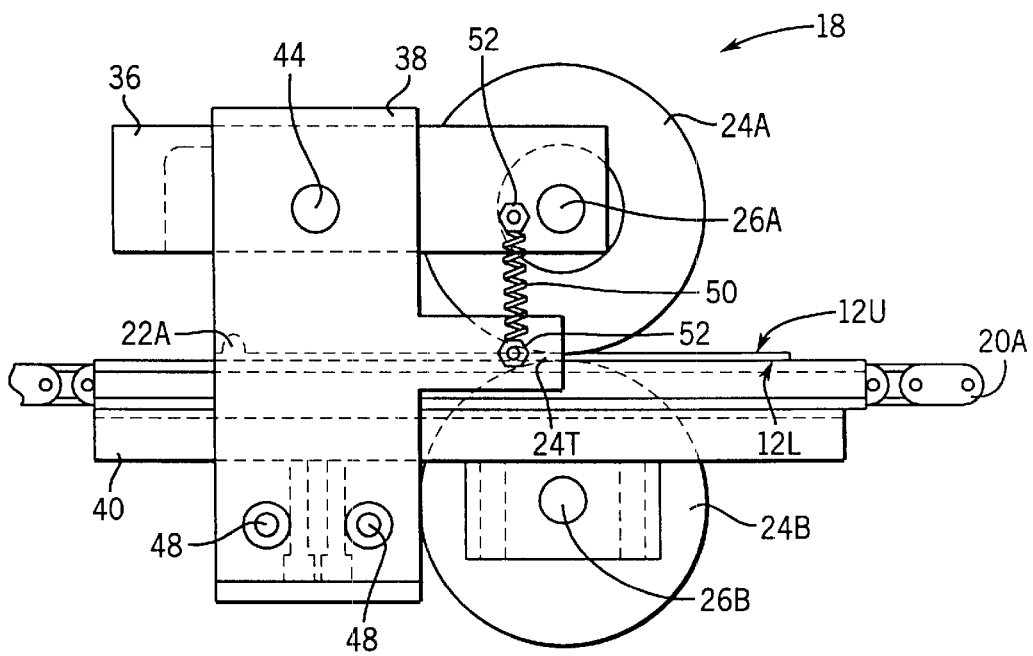
FIG. 5 is a simplified side view of the wire flattener module of the present invention.

Now referring to FIGS. 2 and 5, the carrier 16 (see FIG. 1) of the battery plate stacker 10 preferably comprises a pair of driven chains 20A and 20B. Note that chain 20A has a dog 22A corresponding to a dog 22B on the other chain 20B. The dogs 22A and 22B are for engagement with an edge 12A of a battery plate 12. While in the preferred embodiment, carrier 16 comprises the pair of driven chains 20A and 20B, those skilled in the art understand that alternative means for conveying the battery plate 12 could be substituted, if desired. In FIG. 2, note that the arrow parallel with and in between chains 20A and 20B is meant to indicate that the chains 20A and 20B are driven in the direction of the arrow. Also, note that the edge 12A for engagement with the dogs 22A and 22B is shown as the top edge 12A of the battery plate 12; however, those skilled in the art understand that other edges of the battery plate 12 could be engaged with the dogs 22A and 22B. For example, those skilled in the art understand that the bottom edge 12B could be engaged against dogs 22A and 22B, if desired.

Still with reference to FIGS. 2 and 5, the wire flattener module 18 of the battery plate stacker 10 preferably comprises or includes a pair of members 24A and 24B having a gap (not shown) in between and through which a portion located near an edge 12C of the battery plate 12 passes. Note that in FIGS. 2 and 5 the gap is not shown because the battery plate 12 is inserted in between members 24A and 24B; however, if the battery plate 12 were removed, then the gap between members 24A and 24B would be visible. In the preferred embodiment, the gap is set to be less than or equal to the minimum thickness of a portion of the battery plate 12 located near its edge 12C. Note however, that if the battery plate 12 were flipped-over, then the edge 12D of the battery plate 12 would be in between members 24A and 24B. In this case, the minimum thickness of the portion of the battery plate 12 in the vicinity of the edge 12D would be the preferred size of the gap. In most cases, the battery plate 12 will have substantially uniform thickness; however, use of battery plates 12 having different thicknesses (i.e., near edges 12C and 12D) on the same battery plate 12 is within the intended scope of the present invention. At present, the minimum plate thickness for the battery plates 12 is approximately 0.040". Accordingly, at present, the preferred range for the gap is 0.035" to 0.040". Those skilled in the art understand that a different range for the gap could be used, and different thickness battery plates 12 could be used, if desired. In any event, the preferred range for the gap between members 24A and 24B is set to be less than or equal to the minimum thickness of a portion near the edge 12C or 12D of the battery plate 12 that passes in between members 24A and 24B.

As seen in FIGS. 2 and 5, the preferred shape for members 24A and 24B is that of a disk. Note that the first disk 24B and the second disk 24A are coplanar. Additionally, note that the first 24B and second 24A disks are rotatable about their respective axes 26B and 26A. Also, note that the second disk 24A is spring-loaded towards the first disk 24B. Specifically, note the inclusion of a spring 50 as shown in FIG. 5. In the present exemplary embodiment, the spring 50 tends to pull the second disk 24A toward the first disk 24B; however, a mechanical stop maintains the gap between the disks 24A and 24B. In particular, note that the member 36 has a thicker region up against member 38. FIG. 5 shows this mechanical stop relationship more clearly. Specifically, the upper, left region (as viewed in member 36 of FIG. 5) shows an inverted "L-shaped" region. The right edge of the inverted "L-shaped" region functions as a mechanical stop by resting against member 38, thereby maintaining the desired gap. Note that when a plate 12 moves through the gap, member 36 rotates about axis 44, and in a direction opposing the downward spring force. This is possible despite the mechanical stop of member 36. When a plate 12 moves through the gap, it is the thickness of the plate 12 which moves disk 24A up, and thereby causes opposing downward force from the spring 50 acting via disk 24A onto the upper surface 12U of plate 12. Then, the bottom disk 24B rotates, but does not move vertically, thereby holding plate 12 in the same vertical position. The first 24B and second 24A disks are located below and above, respectively, the battery plate 12 when it lies flat on the carrier 16. Note that throughout this disclosure, mention of the carrier 16 is indicative of the driven chains 20A and 20B previously discussed. A top surface 24T (see FIG. 5) of the first disk 24B is located at a height substantially equal to the bottom or lower surface 12L of the battery plate 12 when it lies flat on the carrier 16. Also note that disks 28A and 28B (to be discussed later) operate like disks 24A and 24B.

In its most general form, the second member or disk 24A has a smooth, circumferential surface that is driven to make forcible, downward contact along an upper surface 12U portion proximate edge 12C when the battery plate 12, while lying flat, is moved by the carrier 16 through the gap. Similarly, the first disk 24B has a smooth, circumferential surface that makes forcible, upward contact along a lower surface 12L portion proximate edge 12C when the battery plate 12, while lying flat, is moved by the carrier 16 through the gap. Note that the "smooth, circumferential surfaces" referred to above correspond to the respective surfaces around the circumferences of the second 24A and first 24B disks. In essence then, these "smooth, circumferential surfaces" are the entire surface along the circumferences of the respective second 24A and first 24B disks. This is so because disks 24A and 24B rotate about their respective axes 26A and 26B.

Again with reference to FIGS. 2 and 5, the wire flattener assembly 18 of the battery plate stacker 10 further includes a second pair of members 28A and 28B having a second gap (not shown) in between and through which another portion located near an opposite edge 12D of the battery plate 12 passes. As before, this second gap is less than or equal to the minimum thickness of the other portion located near the opposite edge 12D of the battery plate 12. As mentioned earlier, battery plate 12 typically has uniform thickness, which means that the first and second gaps would be substantially the same; however, those skilled in the art understand that it is possible to have different distances corresponding to the first and second gaps. In any event, like the first gap, the second gap generally has a range of 0.035" to 0.040". The second pair of members 28A and 28B preferably comprise a first disk 28B and a second disk 28A. The first 28B and second 28A disks are coplanar. Additionally, the first 28B and second 28A disks are rotatable about their respective axes 30B and 30A. Moreover, the second disk 28A is spring-loaded toward the first disk 28B. The first 28B and second 28A disks are located below and above, respectively, the battery plate 12 when it lies flat on the carrier 16. A top surface (like 24T in FIG. 5) of the first disk 28B is located at a height substantially equal to the bottom surface of the battery plate 12 when it lies flat on the carrier 16.

As can be seen, the first 28B and second 28A disks are substantially identical to the first 24B and second 24A disks previously discussed. In this regard, the second member 28A has a smooth, circumferential surface that is driven to make forcible, downward contact along an upper surface 12U portion proximate edge 12D when the battery plate 12, while lying flat, is moved by the carrier 16 through the second gap. Similarly, the first member 28B has a smooth, circumferential surface that makes forcible, upward contact along a lower surface 12L portion proximate edge 12D when the battery plate 12, while lying flat, is moved by the carrier 16 through the second gap.

In FIG. 2, additional portions of the battery plate stacker 10 are shown. In particular, a member 38 is shown coupled to a member 36 around a pivot point 44. In other words, member 36 is free to pivot with respect to member 38 about point 44; however, as mentioned before, inclusion of the thicker, inverted "L-shaped" region on the back side of member 36, creates a mechanical stop which maintains the gap. Member 38 is also coupled to a member 40 via a member 46 and connectors 48. The second member 24 is coupled to member 36 about its axis 26A. The first disk 24B is coupled through a member 42 to member 40 about its axis 26B. Turning now to FIG. 5, the spring 50 is connected to member 36 and member 38 by means of connectors 52. Note that similar support structure, as well as a spring-assembly, like that just discussed is also included for use with disk members 28A and 28B. This additional support and spring-type structure is not shown in FIGS. 2 and 5 for the sake of visual clarity. Nonetheless, similar support and spring-type structure is included. Note that member 40 (and an analogous member not shown, but corresponding to first 28B and second 28A disks) operate as a guide rail. In other words, member 40 and its analogous member in connection with disk members 28A and 28B (not shown) keep the battery plate 12 there between as it moves through the battery plate stacker 10 due to operation of the carrier 16. As mentioned with respect to FIG. 2, the support structure for members 24A and 24B (the "left side" support structure) is shown, while that for members 28A and 28B (the "right side" support structure) is not shown for the sake of visual clarity and simplification of the drawings. Note that the support structure shown in FIG. 5 is labeled as though it were the "left side" support structure, although the relative position of the components in FIG. 5 reveals that this view actually shows the "right side" support structure (not shown in FIG. 2). Since the "right side" support structure is not shown in FIG. 2, the labeling in FIG. 5 corresponds to analogous "left side" support structure members.

The components comprising the wire flattener assembly 18 are made using conventional methods and materials; however, in the preferred embodiment, note that the disk members 24A, 24B, 28A, and 28B are preferably made from hardened steel. Additionally, the thickness of the disk members 24A, 24B, 28A, and 28B is preferably 0.281"; however, those skilled in the art understand that disk thicknesses other than this may be used, if so desired. Additionally, the spring 50 (see FIG. 5) may be selected from any spring well known to those skilled in the art which can urge the upper disk members 24A and 28A down toward their respective disks 24B and 28B, while leaving a gap there between. However, when a battery plate 12 is moved by carrier 16 through the disk members 24A and 24B, and 28A and 28B, the spring 50 (and its corresponding spring not shown for disks 28A and 28B) will create a force along the upper and lower surfaces in proximity to the edges 12C and 12D of the battery plate 12.

The present invention also discloses a method of processing negative expanded metal battery plates 12. This method includes the steps of providing a battery plate 12 ready for envelopment in a separator material (not shown) and having at least one edge with an exposed wire grid 36C or 36D, applying a force simultaneously on an upper 12U and a lower 12L surface in proximity to each edge 12C and 12D with the exposed wire grid 36C and 36D, and enveloping 32 the plate 12. As discussed, a battery plate 12 (ready for envelopment) may be a negative expanded metal battery plate 12 having been pasted, cured, separated, and chemically set. Note that the battery plate 12 shown in FIGS. 3 and 4 has at least one edge 12C or 12D with an exposed wire grid 36C or 36D. In fact, the battery plate 12 has two edges 12C and 12D, each with a respective exposed wire grid portion 36C and 36D. Having the wire flattener assembly 18 simultaneously apply force to the upper 12U and lower 12L surfaces in proximity to edges 12C and 12D of the exposed wire grid portions 36C and 36D, results in moving any wires, such as 36E extending away from the upper 12U and lower 12L surfaces to a position flush therewith. After such wires 36E are flattened into a flush position with upper 12U and lower 12L surfaces, the battery plate 12 is safe for enveloping 32 without any significant likelihood of piercing the separator material. Note that the force applied by the disk members 24A and 24B and disk members 28A and 28B on the battery plate 12 is sufficient to move any wires 36E that extend away from the upper 12U and lower 12L surfaces to positions substantially flush with surfaces 12U and 12L, without damaging the battery plate 12. The typical type of damage referred to here is damage to the battery plate paste. Knowing the thickness of the battery plates 12 being processed, one can select an appropriate gap size and spring 50 to produce appropriate force to move extended wires 36E to positions flush with surfaces 12U and 12L, while at the same time avoiding damage to the battery plate.

It should be understood that the methods and apparatuses described above are only exemplary and do not limit the scope of the invention, and that various modifications could be made by those skilled in the art that would fall under the scope of the invention. For example, the present invention has been discussed as useful for enveloping negative expanded metal battery plates; however, it may be found that positive expanded metal battery plates are used in the future. In this regard, the present invention could be used with positive as well as negative expanded metal battery plates. Additionally, the present invention has disclosed, by way of example, the use of a single spring (per pair of disks) to force the upper disks downward towards the lower disks. It is considered within the scope of the present invention that a single spring could be used to force the lower disks up towards the top disks. For that matter, it is also considered within the scope of the present invention that a pair of springs are used with each pair of disks, such that the upper disks are driven downward through spring force, while the lower disks are driven upward through spring force. Additionally, the use of a mechanical stop has been disclosed, by way of example, to fulfill the disclosed gap between the disks. Those skilled in the art understand that alternative manners of establishing a mechanical stop could be implemented, if so desired, to maintain the required gap. Moreover, those skilled in the art also understand that the required gap could also be established without the use of a mechanical stop. Also, the present invention has disclosed the preferred use of rotating disks; however, non-rotating disks could also be implemented on one or more of the disks. Alternatively, the use of disks could be obviated altogether. For example, the wire flattener module of the present invention could implement a press for the upper and lower surfaces on one edge of the battery plate, and a second press for the upper and lower surfaces on the opposite edge of the battery plate. In this alternative embodiment, it would be desirable to temporarily stop the motion of the plate as the presses made contact with the plate. For this reason, the use of the rotating disks is typically preferred.

We claim:

1. A method for manufacturing a battery plate comprising:
   providing a battery plate having a metal grid and battery paste covering at least a portion of the metal grid, the battery plate having an exposed wire grid portion extending outward from a surface of the battery paste; and
   applying a force to the exposed wire grid portion in a direction toward the surface of the battery paste.

2. The method of claim 1 further comprising:
   selecting the force such that the force is sufficient to move the exposed wire grid portion to a position substantially flush with the surface of the battery paste.

3. The method of claim 1 wherein:
   the force is applied to the exposed wire grid portion and to a region of the surface of the battery paste in proximity to the exposed wire grid portion.

4. The method of claim 1 wherein:
   the exposed wire grid portion is located near an edge of the battery plate.

5. The method of claim 1 further comprising:
   enveloping the battery plate in a separator material after applying the force to the exposed wire grid portion.

6. A method for manufacturing a battery plate comprising:
   providing a battery plate having a metal grid and battery paste covering at least a portion of the metal grid and defining a first pasted surface of the battery plate and an opposed second pasted surface of the battery plate, the battery plate having an exposed wire grid portion extending outward from the first pasted surface; and
   applying a first force to the exposed wire grid portion and to a region of the first pasted surface in proximity to the exposed wire grid portion and simultaneously applying a second force to an area of the second pasted surface opposite the region of the first pasted surface.

7. The method of claim 6 wherein:
   the first force and the second force are applied by moving the region of the first pasted surface and the area of the second pasted surface through a pair of members having a gap in between, the pair of members being positioned such that the gap is less than or equal to a thickness of the battery plate measured between the region of the first pasted surface and the area of the second pasted surface.

8. The method of claim 6 wherein:
   the exposed wire grid portion is located near an edge of the battery plate.

9. The method of claim 6 further comprising:
   enveloping the battery plate in a separator material after applying the first force and the second force.

10. The method of claim 6 further comprising:
    selecting the first force and the second force such that the first force and the second force are sufficient to move the exposed wire grid portion to a position substantially flush with the first pasted surface of the battery plate.

11. A method for manufacturing battery plates comprising:
    providing a plurality of battery plates, each battery plate having an expanded metal grid and a battery paste covering at least a portion of the expanded metal grid and defining a first pasted surface and an opposed second pasted surface of the battery plate, each battery plate having first and second opposed edges, at least one of the battery plates having an exposed extension extending outward from the first pasted surface at one of the opposed edges of the battery plate;
    for each battery plate, applying a first force to the first pasted surface near the first opposed edge and applying a second force to the second pasted surface near the first opposed edge;
    for each battery plate, applying a third force to the first pasted surface near the second opposed edge and applying a fourth force to the second pasted surface near the second opposed edge;

selecting the first force, the second force, the third force and the fourth force such that the first force, the second force, the third force and the fourth force are sufficient to move each exposed extension substantially flush with the first pasted surface of the battery plate;

enveloping each battery plate in a separator material.

12. The method of claim 11 wherein the first force, the second force, the third force and the fourth force are applied simultaneously.

13. The method of claim 11 wherein:

the first force and the second force are applied by moving the first opposed edge of each battery plate through a first pair of members having a first gap in between, the first pair of members being positioned such that the first gap is less than or equal to a minimum thickness for the first opposed edge of each of the battery plates.

14. The method of claim 13 wherein the third force and the fourth force are applied by moving the second opposed edge of each battery plate through a second pair of members having a second gap in between, the second pair of members being positioned that the second gap is less than or equal to a minimum thickness for the second opposed edge of each of the battery plates.

15. The method of claim 11 wherein the first force is applied simultaneously with the second force, and the third force is applied simultaneously with the fourth force.

16. The method of claim 11 wherein the exposed extension comprises a wire.

17. The method of claim 11 wherein the exposed extension comprises a wire grid portion.

18. The method of claim 13 wherein the first pair of members comprises a pair of disks.

19. A method of processing battery plates comprising:

providing a battery plate having at least one edge including an extension member;

applying a force to a first surface of the battery plate and a second surface of the battery plate;

wherein the force is sufficient to move the extension member to a position substantially flush with the first and second surfaces.

20. The method of claim 19 wherein the force is applied in proximity to the at least one edge of the battery plate.

21. The method of claim 20 wherein providing the battery plate further comprises providing an expanded metal negative battery plate.

22. The method of claim 21 further comprising coupling a separator to the battery plate.

23. The method of claim 22 wherein the extension member is wire grid.

24. The method of claim 23 wherein the first surface is an upper surface and the second surface is a lower surface.

25. The method of claim 24 wherein the force is applied simultaneously to the first surface and the second surface of the battery plate.

26. The method of claim 25 wherein the applied force does not substantially damage the battery plate.

27. The method of claim 22 further comprising stacking the battery plate with another battery plate.

28. The method of claim 22 further comprising stacking the negative battery plate with a positive battery plate in an alternating pattern.

* * * * *

UNITED STATES PATENT AND TRADEMARK OFFICE
CERTIFICATE OF CORRECTION

PATENT NO.     : 6,442,811 B1
DATED          : September 3, 2002
INVENTOR(S)    : Raad A. Dawood, Donald C. Whittenburg and Raymond P. Rubocki It is certified that error appears in the above-identified patent and that said Letters Patent is hereby corrected as shown below:

<u>Column 11,</u>
Line 24, insert -- such -- after "positioned".

Signed and Sealed this

Twenty-fifth Day of February, 2003

JAMES E. ROGAN
*Director of the United States Patent and Trademark Office*